United States Patent [19]

Carlson

[11] Patent Number: 4,936,779

[45] Date of Patent: Jun. 26, 1990

[54] EARTH PLANET MODEL

[76] Inventor: Ronald B. Carlson, E. 508 Wabash, Spokane, Wash. 99207

[21] Appl. No.: 391,103

[22] Filed: Aug. 7, 1989

[51] Int. Cl.$^5$ .............................................. G09B 27/08
[52] U.S. Cl. ...................................... 434/143; 368/24; 434/136; 434/142; 434/145
[58] Field of Search ............... 434/143, 145, 136, 137, 434/142; 368/23, 24

[56] References Cited

U.S. PATENT DOCUMENTS

| | | | |
|---|---|---|---|
| 1,959,601 | 5/1934 | Schulse | 434/143 X |
| 2,680,308 | 6/1954 | Miltenberger | 434/143 |
| 2,907,166 | 10/1959 | Baccara | 434/142 X |
| 3,049,813 | 8/1962 | List | 434/136 |
| 3,197,893 | 8/1965 | Mariotti | 434/143 |
| 3,348,321 | 10/1967 | Cunningham | 434/142 |
| 4,102,121 | 7/1978 | Veazey | 434/142 X |
| 4,666,310 | 5/1987 | Snapka | 434/143 X |
| 4,761,138 | 8/1988 | Niesyn | 434/143 |

*Primary Examiner*—William H. Grieb
*Attorney, Agent, or Firm*—Wells, St. John & Roberts

[57] ABSTRACT

An earth planet model as illustrated in the drawings having a base supporting a globe cradle 28. The globe cradle supports a glove 40 at a north pole bearing 48 and at a south pole bearing 50 with the polar axis of the globe being inclined. The model 10 has a polar shaft 66 with a north pole shaft end 68 extending upward through the north pole bearing 48 and a south pole bearing end 70 extending downward through the south pole bearing 50. A light illuminating means is tiltably mounted on the polar shaft 66 for tilting movement and for rotation with the shaft for illuminating the interior of the globe. The model 10 has a manual adjusting means associated with the north pole bearing 48 for manually adjusting the inclination of the illuminating means in response to the setting of a manual knob. A timer drive is detachably coupled to the south pole shaft end 70 for rotating the polar shaft with respect to the globe. The timer is removably mounted on the base. A dimmer circuit 128 is provided to adjust the magnitude of the illumination within the globe.

17 Claims, 6 Drawing Sheets

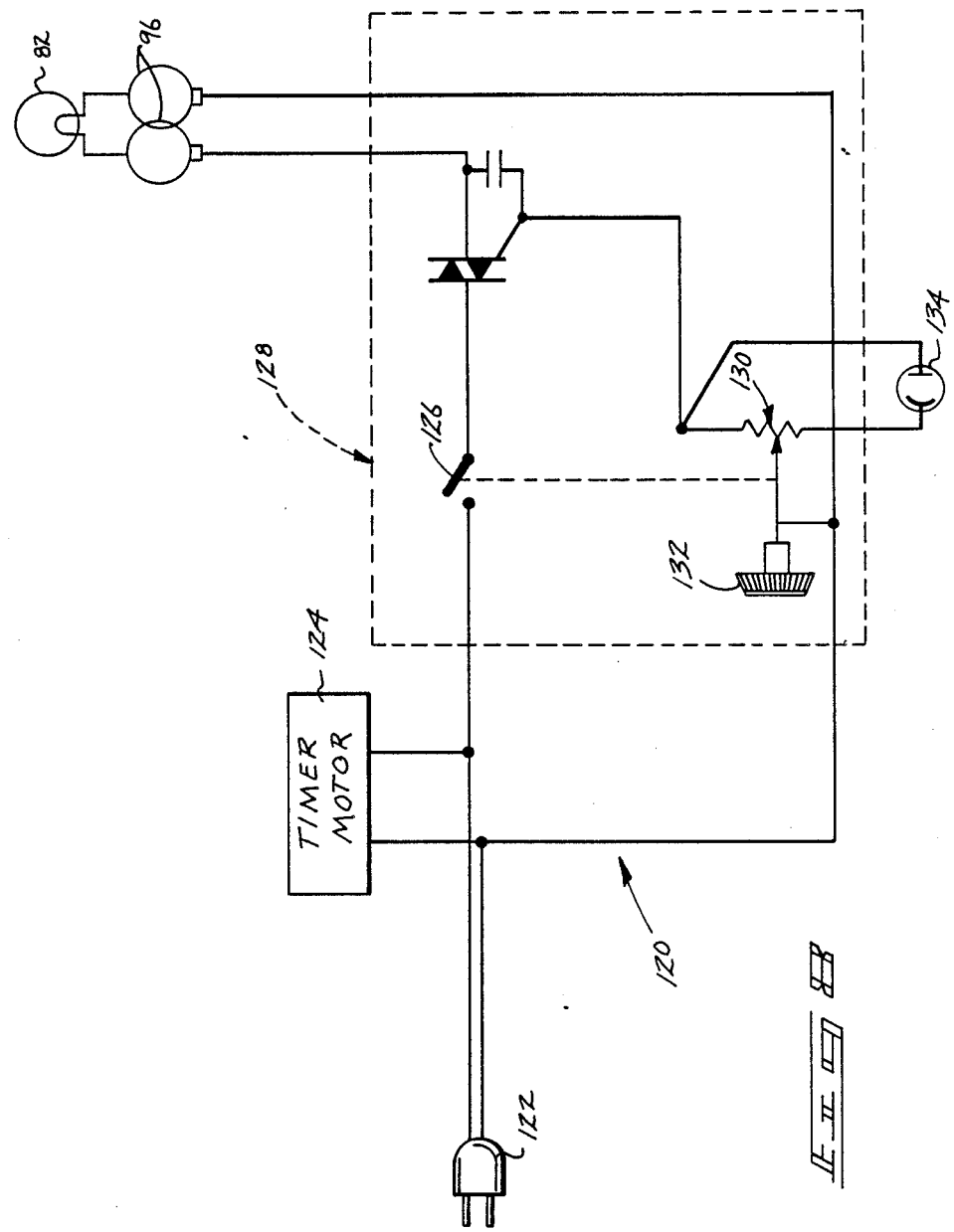

EARTH PLANET MODEL

Technical Field

This invention relates to earth planet models or globes that are internally illuminated to display the rotation of the earth with respect to the sun.

Background of the Invention

Numerous rather complicated earth planet models have been developed that include an internal illumination system for illuminating an internal portion of a translucent globe to represent the rotation of the earth with respect to the sun to provide a display of the relative movement of the earth with respect to the sun in a twenty-four hour period.

Such previous attempts have been quite complicated rendering such systems quite expensive for the vast majority of the population. Thus the educational benefits of such a system have been unavailable to those with more limited means.

Examples of such previous devices are illustrated in the following U.S. Pat. Nos:

| Patent No. | Inventor | Issue Date |
|---|---|---|
| 2,907,166 | Baccara | October 6, 1959 |
| 3,197,893 | Mariotti | August 3, 1965 |
| 4,102,121 | Veazey | July 25, 1978 |
| 4,666,310 | Snapka | May 19, 1987 |
| 4,761,138 | Niesyn | August 2, 1988 |

Of the principal objects of this invention is to provide a new earth planet model that is considerably less expensive than previous models having the capability of displaying movement of the earth with respect to the sun utilizing an internal illumination system.

The further object of this invention is to provide a unique earth planet model having the capability of illuminating at least half of the globe in which the intensity of the illumination can be varied in response to the level of the ambient light.

A further object of this invention is to provide a unique earth planet model having a globe that may be readily removed from a base to readily install new bulbs.

These and other objects and advantages of this invention will become apparent upon reading the following detailed description of a preferred embodiment.

BRIEF DESCRIPTION OF THE DRAWINGS

The preferred embodiment of this invention is illustrated in the accompanying drawings, in which:

FIG. 8 is an electrical schematic showing an electrical system for the model particularly emphasizing the light dimming circuit.

DETAILED DESCRIPTION OF THE PREFERRED EMBODIMENTS

The following disclosure of the invention is submitted in furtherance with the constitutional purpose of the Patent Laws "to promote the progress of science and useful arts" (Article 1, Section 8).

Figure 1:
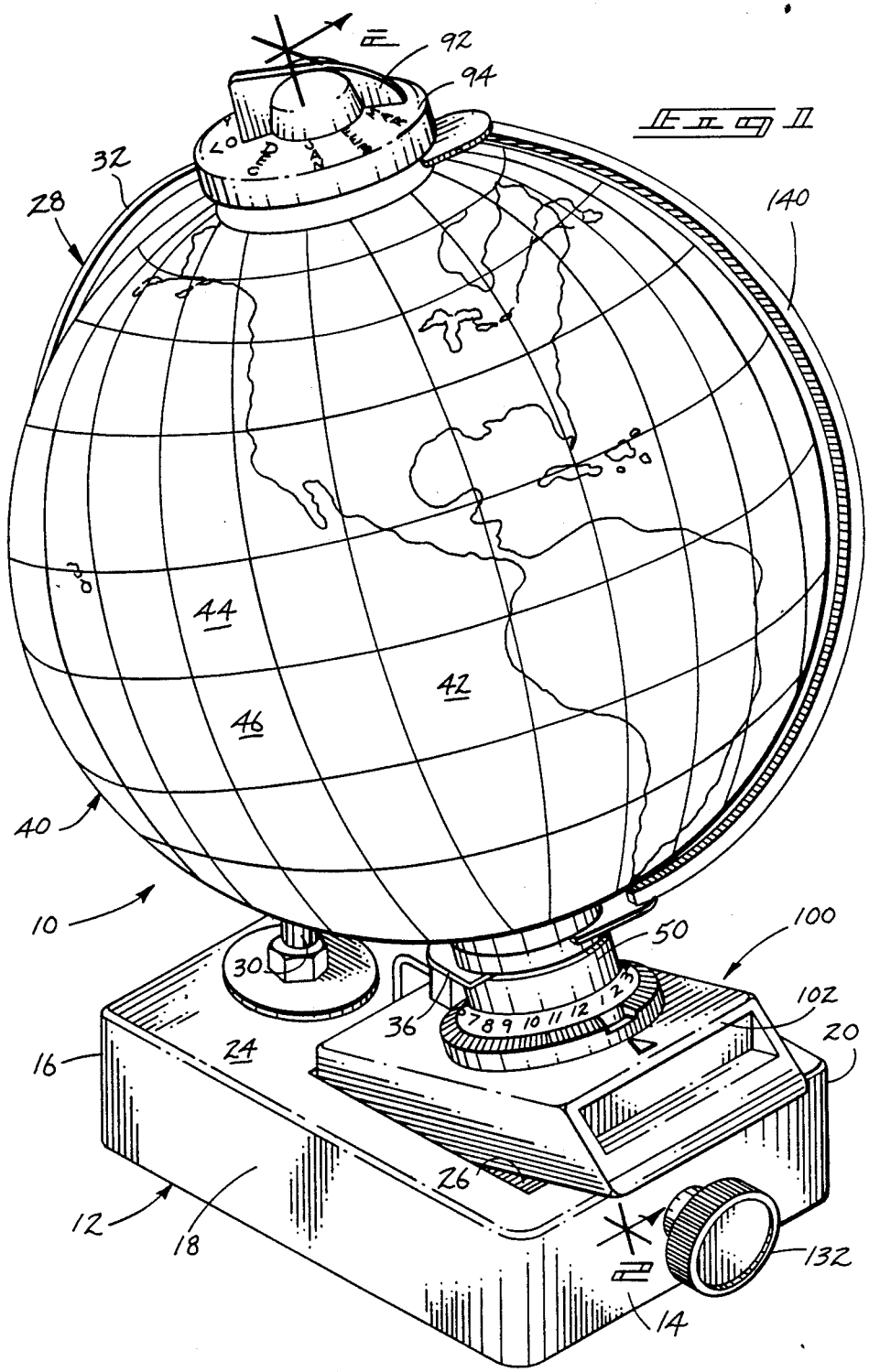
FIG. 1 is a perspective view of an earth planet model incorporating a preferred embodiment of this invention illustrating a translucent globe mounted on a cradle supported by a base.

Referring more specific to the drawings, as illustrated in FIG. 1 an earth planet model generally designated with the numeral 10 that has a supporting base 12. Base 12 includes a front wall 14, a rear wall 16, and side walls 18 and 20. A top wall 24 is provided with an indentation 26. The model 10 includes a cradle assembly 28 that is supported on the base. The cradle assembly 28 includes a cradle pedestal 30 affixed to the base 12 spaced from the indentation 26. The assembly 28 includes a curved cradle arm 32 that extends upward to a forked north pole end 34 in one direction and to a forked south pole end 36 in the opposite direction.

A cradle assembly 28 is intended to support a globe 40. The globe 40 is made of a translucent material having an outer surface 42 imprinted to represent the surface of the earth. Longitudinal lines extend between the north and south poles at 15° intervals and parallel latitude markings are situated at intervals between the north pole and the south pole. For ease of maintenance and dissemblement, the globe 40 comprises a upper section or northern half 44 and a lower section or southern half 46. The globe is preferably split at the equator.

Figure 2:
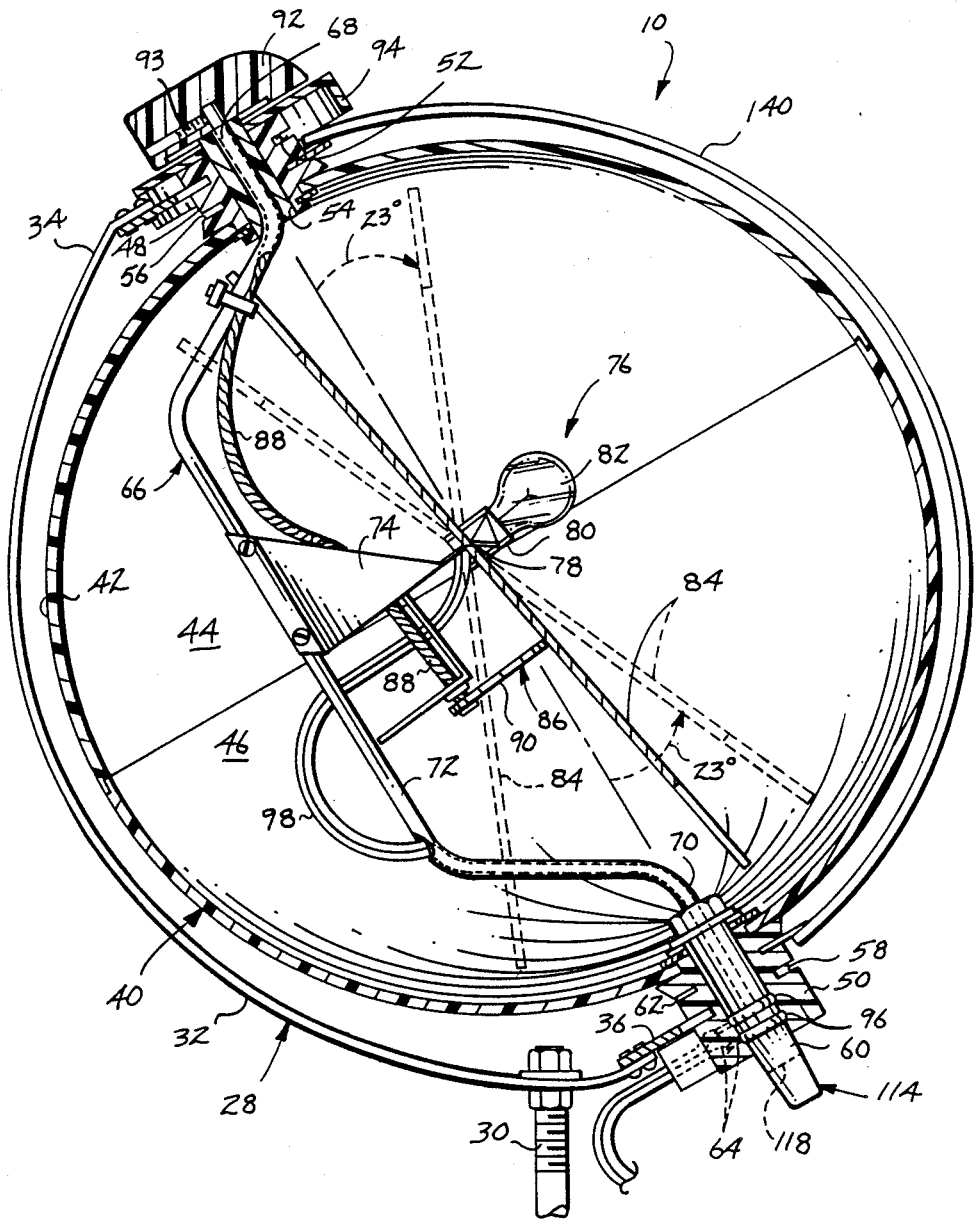
FIG. 2 is a vertical cross-sectional view taken along line 2—2 in FIG. 1 illustrating a translucent globe with an illumination means within the globe for illuminating substantially one-half of the globe to simulate the exposure of the sun on the earth as the earth rotates.
Figure 3:
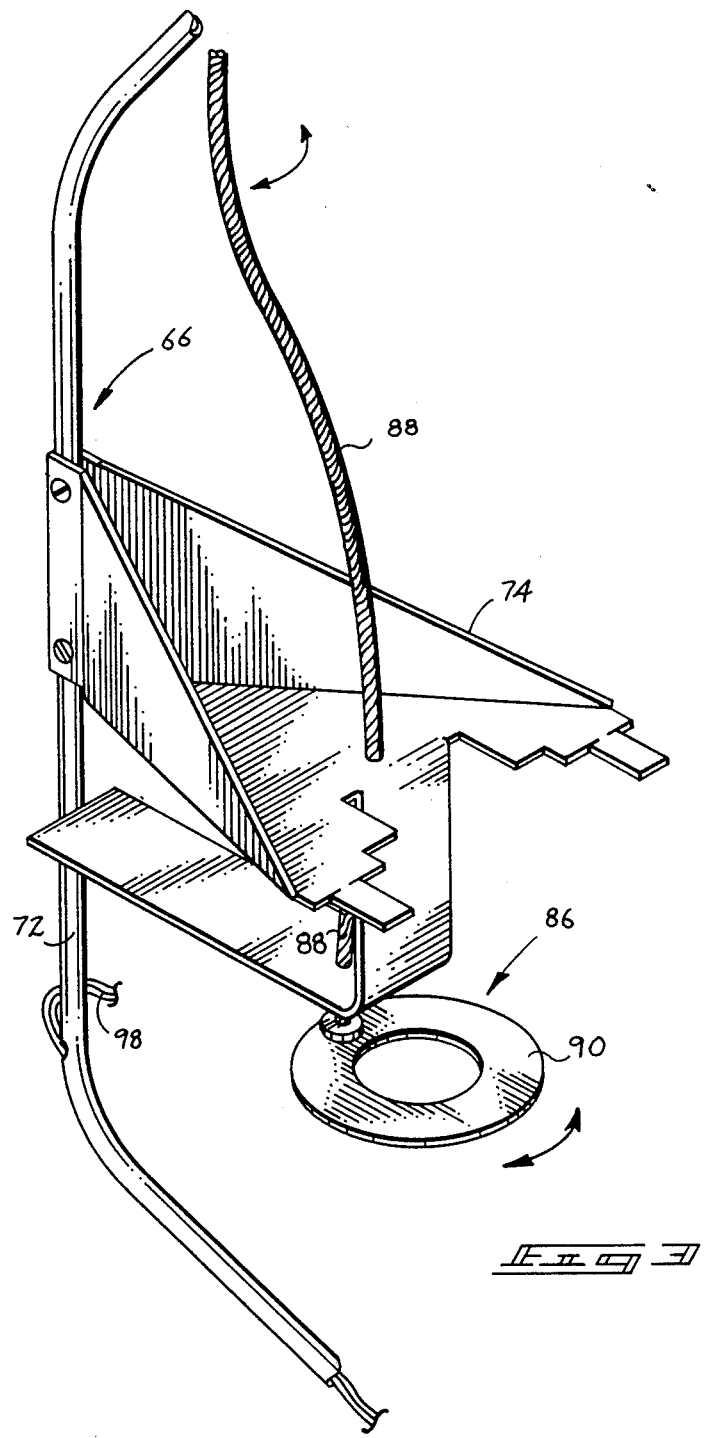
FIG. 3 is an isolated perspective view of a polar shaft mechanism and bracket for tiltably supporting the illumination means.

Further the globe 40 includes a north pole bearing 48 that is supported by the forked north pole end 34 of the cradle arm 32 and a south pole bearing 50 supported by the forked south pole end 36 of the cradle arm 32. The north pole bearing 48 includes a circular groove 52 formed therein for frictionally receiving the forked north pole end 34 as illustrated in FIG. 2. Furthermore the north pole bearing 48 includes a bore 54 formed therethrough. An additional circular groove 56 is formed in the north pole bearing 48 for receiving an upper end of a movable longitudinal marker 140.

The south pole bearing 50 includes a circular groove 58 formed therein for receiving the forked south pole end 36 for supporting the globe at the south pole bearing 50. The south pole bearing 50 includes a bore 60 extending therethrough. Additionally a circular groove 62 is formed in the south pole bearing 50 for receiving a lower end of movable longitudinal marker 140 as illustrated in FIG. 2. Additionally the south pole bearing 50 has electrical commutation brushes 64 for transmitting electrical energy from the bearing to complimentary slip rings 96.

The model 10 includes a polar shaft 66 within the globe 40, with a north pole shaft end 68 extending outward along the polar axis through the bore 54 in the north pole bearing 48. The polar shaft further includes a south pole shaft end 70 that extends through the south pole bearing bore 60. The polar shaft includes an offset intermediate tubular section 72 that extends between the north pole shaft end 68 and the south pole shaft end 70. Preferably a portion of the shaft 72 is hollow. The polar shaft 66 has a supporting bracket 74 mounted thereon for supporting a hemisphere illuminating means 76. The polar shaft 66 is adapted for rotation about the polar axis of the globe for rotating the hemisphere illuminating means within the globe to simulate the rotation of the earth with respect to the sun.

Figure 5:
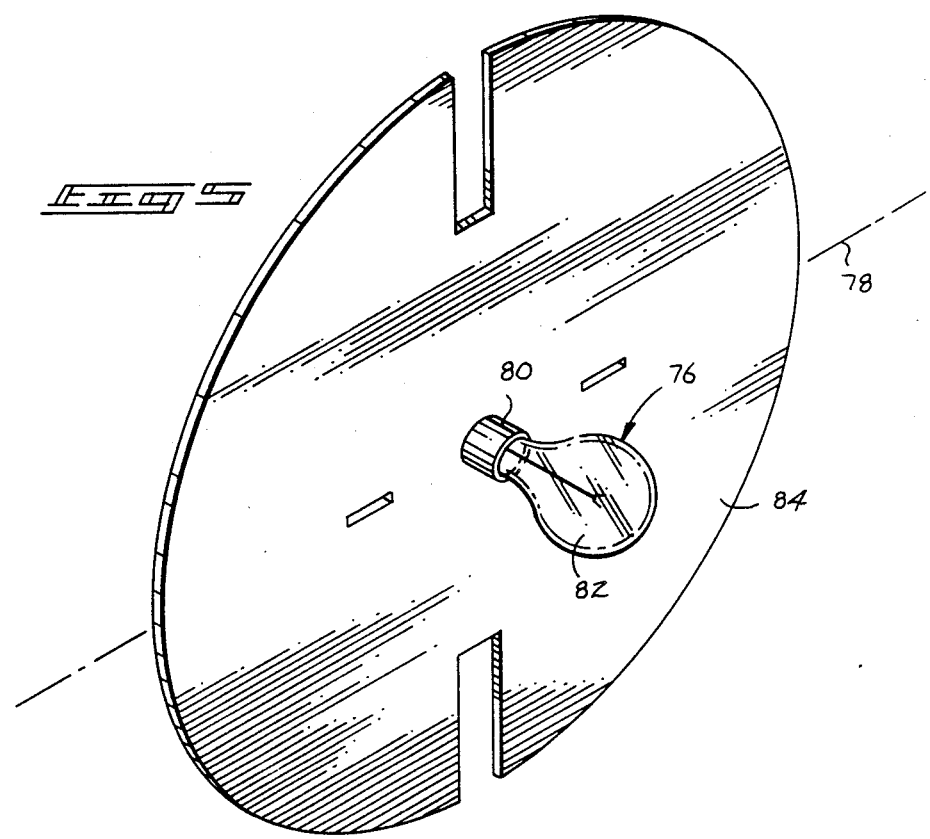
FIG. 5 is an isolated fragmentary perspective view of a portion of the illuminating means showing a light bulb mounted on a shade disk.

The hemisphere illuminating means 76 is mounted for tilting movement about a horizontal tilt axis 78 (appearing in end view as a point in FIG. 2 and as a center line in FIG. 5). The hemisphere illuminating means 76 includes a light socket 80 for supporting a bulb 82. A shade 84 in the form of a disk (illustrated specifically in FIG. 5) is provided to reflect light from the bulb 82 against and illuminate substantially one-half of the interior of the globe to represent that portion of the globe being illuminated by the sun. The disk also shades substantially the other half of the globe interior to represent that area of the globe not illuminated by the sun.

The earth planet model 10 further includes a tilt adjusting means generally designated with the numeral 86 for tilting the hemisphere illuminating means 76 particularly to tilt the shade 84 to various inclinations corresponding to various seasons of the year. The tilt adjusting means 86 includes a flexible cable 88 that extends through an upper portion of the tubular shaft section 72. The lower end of the flexible cable 88 extends downward of the support bracket 74 to a cam 90 mounted on the bottom cable end. The upper end of the flexible cable 88 is attached to a dial or knob 92 by set screw 93 (FIG. 2). As the dial or knob 92 is turned, it causes the cam 90 to rotate in response to such turning. A circular month scale 94 is frictionally mounted to the north pole shaft end 68 for rotation therewith. The circular month scale 94 has angularly spaced demarcations indicating the various months of the year as illustrated in FIG. 1.

The dial 92 is manually operated to rotate the cam 90 against the lower portion of the shade 84 to pivot the shade 84 about the tilt axis 78 to adjust the inclination of the shade to a desired orientation indicated by the month pointed to by the dial or knob 92.

The south pole shaft end 70 includes slip rings 96 formed thereon for mating with the electrical brushes 64 to transfer electrical current through an electrical cord 98 to the light socket 80.

Figure 4:
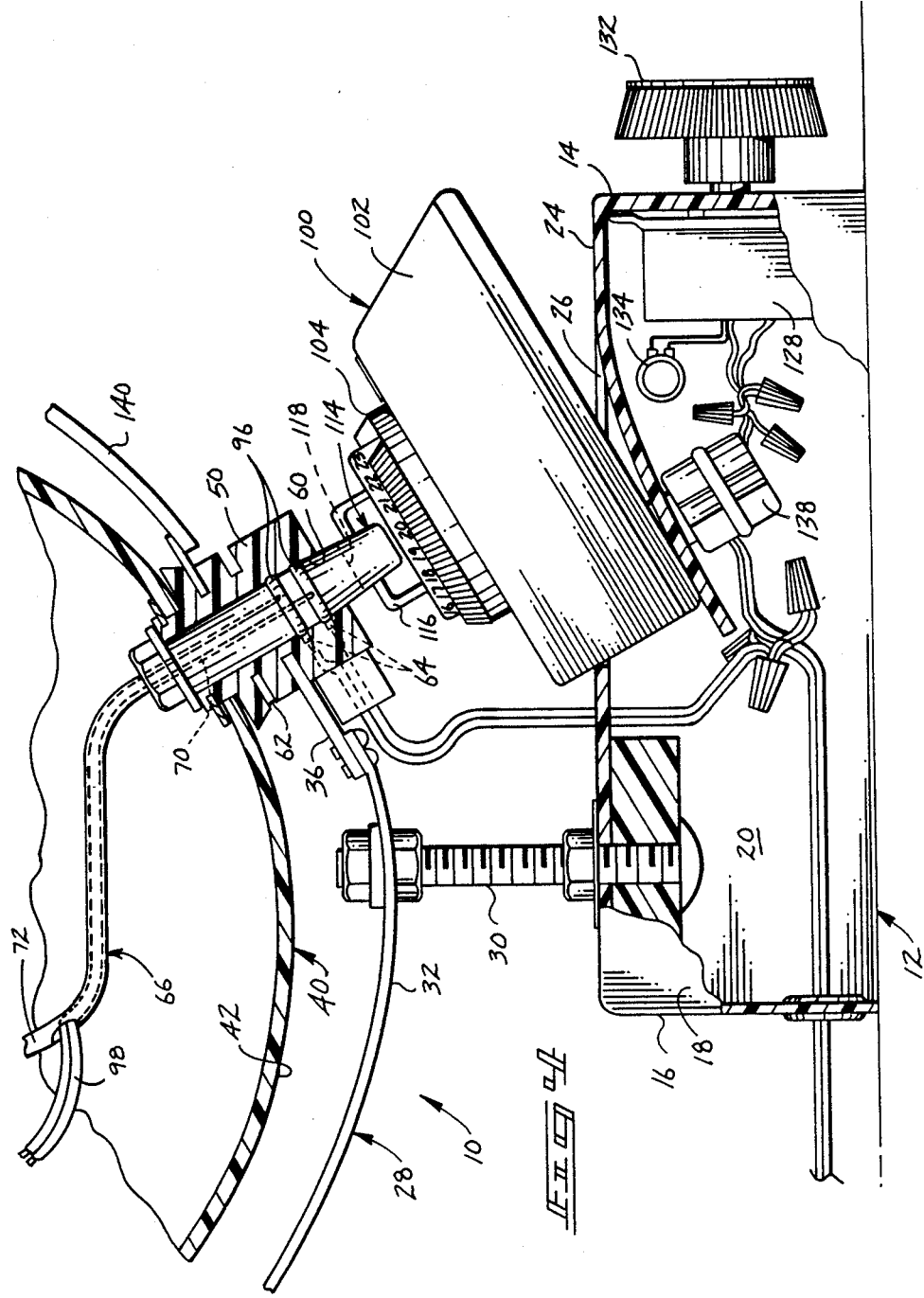
FIG. 4 is a vertical cross-sectional view of a lower section of the model illustrating a removable timer drive for rotating the illumination means.
Figures 6, 7:
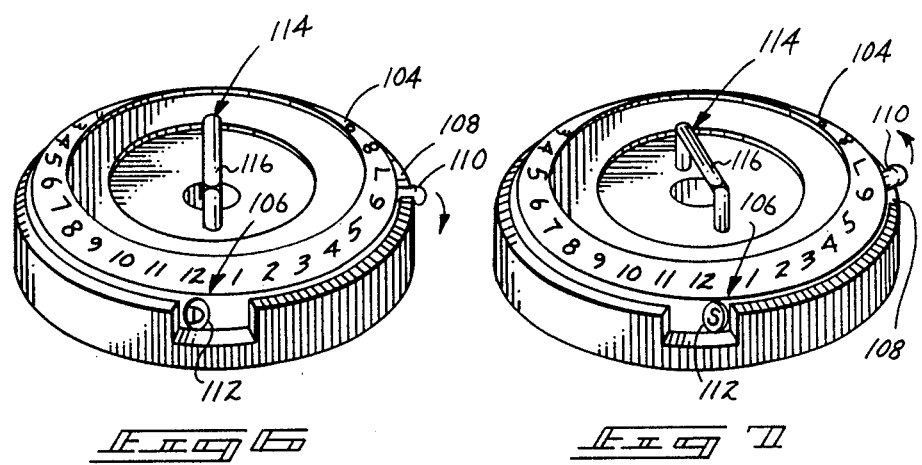
FIG. 6 is an isolated perspective view of a top portion of the timer drive illustrating an hour ring with hour markings thereon showing the ring in a daylight saving position.
FIG. 7 is an isolated perspective view similar to FIG. 6 except showing the hour ring in a standard time position.

The planet model 10 further includes a day timer or 24-hour drive 100 that is removably mounted on the base 12 within the indentation 26 as illustrated in FIGS. 1 and 4. The day timer 100 is a conventional unit that may be purchased from many sources and will not be described in any specific detail other than the output timer shaft (not shown) rotates one revolution each twenty-four hours. The day timer 100 includes its own separate housing 102 that contains the necessary motor and mechanism for rotating the output shaft. The day timer 100 is modified to include an hour ring 104 on the top thereon for indicating the time of day along its periphery. The hour ring 104 is frictionally positioned on the housing 102 for rotation with the output shaft. Day timer 100 includes a daylight saving adjustment feature 106 that includes a notch 108 with a lever 110 for moving the hour ring forward or rearward one hour depending upon whether the observer is on standard time or daylight saving time. Standard time or daylight saving time indicia 112 is formed on the circular hour ring 104 as illustrated in FIGS. 6 and 7.

The model 10 further includes a detachable coupling 114 that is connected to the output shaft (not shown) of the day timer for detachably coupling the output shaft to the south pole shaft end 70. A detachable coupling 114 includes a blade 116 mounted on the output shaft of the day timer 100 for projecting into a female slot 118 formed in the south pole shaft end 70 as illustrated in FIGS. 2 and 4.

When it is desired to remove the globe 40 from the cradle assembly 28, one merely turns the hour ring to the 12 o'clock position and then frictionally slides the north pole bearing and the south pole bearing 48 and 50 from their respective forked ends 34 and 36. Furthermore the south pole shaft end 70 merely slides off the blade 116. Consequently it is very easy to replace bulbs within the globe 40 or to make necessary repairs.

The model 10 includes an electrical circuit generally referred to with the numeral 120. The electrical circuit 120 includes a wall socket plug 122 as electrically connected to the day timer motor 124. The circuit has an on/off switch 126 that is included within a light dimmer circuit 128. The light dimmer circuit 128 includes a rheostat 130 that is operated by a rheostat knob 132 mounted on the front wall 14 (FIGS. 1 and 4). When the rheostat knob 132 is initially rotated, it closes the on/off switch 126. Further rotation of the knob adjusts the rheostat 130 to adjust the magnitude of the illumination of the bulb within the globe 40. Consequently the rheostat 130 sets the minimum illumination level within the globe 40.

The electrical system 120 further includes a photocell 134 that is mounted in side wall 20 for sensing the magnitude or intensity of the ambient light within the room. The photocell 134 is connected electrically in parallel with the rheostat 130 to increase the illumination within the globe in proportion of the ambient light. For example if the room is in very bright light, the photocell will increase the current to the bulb causing the intensity of the light within the bulb to increase so that the visual display is more noticeable. If the ambient light is at a very low level or in a dark room, then the magnitude of the illuminating light within the globe 40 will be at the minimum value set by the rheostat 130. The photocell 134 serves as a variable sensor for not only sensing the ambient light but for adjusting the resistance between the power source and the light to adjust the light in the globe proportionally to the ambient light.

It should be noted that the day timer 100 is merely plugged in to a socket 138 as illustrated in FIG. 4. If the day timer 100 becomes defective, one merely disconnects the day timer from the socket 138 and removes the day timer when the day timer is in the 12 o'clock position. Furthermore, since the day timer is a very commercially available item, it is quite inexpensive to provide a low cost illuminated earth planet model.

To set the inclination or tilt of the shade 84 one merely rotates the dial 92 to the desired month. Consequently as the polar shaft 66 is rotated, that portion of the earth that is illuminated during that particular month will be circumscribed as the polar shaft rotates through one revolution in a twenty-four hour period. To determine the time in any particular place on the globe, one merely moves the movable marker 140 about the globe 40 to the particular location and then visually notices the time indicated at that position on the hour scale 104. For example if a person wants to determine what time it is in Tokyo, Japan, one merely moves the movable marker 140 to the longitudinal position of Tokyo and immediately looks at the hour scale 104 to indicate the time of day in Tokyo.

In compliance with the statute, the invention has been described in language more or less specific as to structural features. It is to be understood, however, that the invention is not limited to the specific features shown, since the means and construction herein disclosed comprise a preferred form of putting the invention into effect. The invention is, therefore, claimed in any of its forms or modifications within the proper scope of the appended claims appropriately interpreted in accordance with the doctrine of equivalents.

I claim:

1. An earth planet model, comprising:
   a globe of light transmitting material;
   said globe having an outer surface representing the surface of the planet earth with respect to a polar axis;
   said globe having a north pole bearing and a south pole bearing at opposite ends along a polar axis;
   a supporting base;
   cradle means on the supporting base for releasably supporting the pole bearings with the polar axis incline with respect to the base;
   hemisphere illuminating means tiltably mounted within the globe for illuminating substantially one-half of the globe to represent that portion of the earth illuminated by the sun;
   adjusting means for tilting the illuminating means with respect to the polar axis to represent the orientation of the earth with respect to the sun as the earth makes an orbit about the sun;
   drive means operatively connected to the hemisphere illuminating means for rotating the hemisphere illuminating about the polar axis with respect to the base at the rate of one revolution per day to represent the rotation of the earth about the polar axis with respect to the sun; and
   detachable coupling means operably interconnecting the south pole bearing and the drive means to enable the globe to be easily mounted and dismounted from the cradle means and connected and disconnected from the drive means.

2. The earth planet model as defined in claim 1 wherein the adjusting means for tilting the illuminating means includes:
   (a) rotatable cam engaging a tiltable illuminating means;
   (b) a shaft means rotatably connected to the cam and extending coaxially through the north pole bearing;
   (c) hand gripping means adjacent the north pole bearing and operatively connected to the shaft means for manually rotating the shaft means to rotate the cam to tilt the illuminating means to a desired angle representing a particular tilt angle with respect to the sun.

3. The earth planet model as defined in claim 2 wherein the hand gripping means includes a dial connected to the shaft means to enable the manual rotation of the shaft means and an angular scale encircling the dial with angularly spaced indicia thereon representing months of the year to enable a person to manipulate the dial to a desired month of the year.

4. The earth planet model as defined in claim 1 further comprising a dimmer circuit operably connected to the illuminating means for sensing the level of ambient light and adjusting the magnitude of illumination within the translucent globe in response to the sense level of ambient light.

5. The earth planet model as defined in claim 1 further comprising a dimmer circuit operably connected to the illuminating means for adjusting the magnitude of the illumination within the translucent globe.

6. The earth planet model as defined in claim 1 wherein the drive means is enclosed in a housing that is detachably mounted on the base.

7. An earth planet model, comprising:
   a globe of translucent material;
   said globe having an outer surface representing the surface of the earth planet with respect to a polar axis;
   hemisphere illuminating means mounted for rotation about the polar axis within the globe for illuminating substantially one-half of the globe to represent that portion of the earth illuminated by the sun;
   rotating means operatively connected to the globe for rotating the hemisphere illuminating means one revolution about the polar axis and relative to the globe each twenty-four hours to represent the movement of the earth about its axis relative to the sun; and
   light adjusting means operably connected to the hemisphere illuminating means and responsive to the magnitude of ambient light outside the globe for automatically adjusting the magnitude of illumination by the hemisphere illuminating means in response to changes in the magnitude of the ambient light.

8. The earth model as defined in claim 7 wherein the light adjusting means has manual variable means for manually adjusting the magnitude of the illumination by the hemisphere illuminating means.

9. The earth planet model as defined in claim 8 wherein the light adjusting means further includes ambient light sensing means for sensing the magnitude of the ambient light and for automatically adjusting the magnitude of the illumination by the hemisphere illuminating means in response in changes in the magnitude of the ambient light.

10. A earth planet model, comprising:
    a base;
    a globe of translucent material;
    said globe having an outer surface representing the surface of the earth with respect to a polar axis;
    said globe having a north pole bearing and a south pole bearing along the polar axis;
    a globe cradle supporting the globe on the base at the north and south pole bearings with the polar axis inclined relative to the base;
    a polar shaft having a north pole end and a south pole end extending through the globe and rotatably supported by the north pole bearing and the south pole bearing respectively;
    a hemisphere illuminating means supported on the polar shaft for illuminating substantially one-half of the interior of the globe to represent a hemisphere of the earth illuminated by the sun;
    drive means operatively connected to the south pole end of the polar shaft for rotating the polar shaft and the hemisphere illuminating means about the polar axis at a rate of one revolution per twenty-four hours to represent the rotation of the earth about its axis relative to the sun;

said hemisphere illuminating means being tiltable relative to the polar axis; and a tilt adjusting means adjacent the north pole shaft end for adjustably tilting the hemisphere illuminating means with respect to the polar axis to represent the changing axial orientation of the earth with respect to the sun as the earth makes an orbit about the sun.

11. The earth planet model as defined in claim 10 wherein the tilt adjusting means includes:
(a) cam means engaging the hemisphere illuminating means for adjusting the tilt angle of the hemisphere illuminating means in response to the rotation of the cam means;
(b) manual turning means adjacent the north pole bearing and operably connected to the tilt cam for turning the tilt cam to manually adjust the tilt angle of the hemisphere illuminating means.

12. The earth planet model as defined in claim 11 wherein the tilt adjusting means further includes a flexible shaft interconnecting the manual turning means and the tilt cam for transmitting movement of the manual turning means to the tilt cam.

13. The earth planet model as defined in claim 12 wherein at least a portion of the polar axis is hollow and receives a flexible tilt shaft therein.

14. The earth planet model as defined in claim 12 wherein the manual turning means includes:
(a) a manual knob with an angular orientation means thereon; and
(b) a stationary circular scale surrounding the manual knob indicating months of a year thereon so that when the manual knob is set at a desirable month's setting in relation to the scale, the illuminating means is set at a tilt angle corresponding to the desired month of the year.

15. The earth planet model as defined in claim 10 wherein the north pole and the south pole bearing shafts are releasably supported by the cradle means and wherein the model further includes detachable coupling means interconnecting the drive means and the south pole end of the polar shaft to enable the globe to be readily removed from the model.

16. The earth planet model as defined in claim 10 wherein the drive means is a self-contained unit and is removably mounted to the base.

17. The earth planet model as defined in claim 10 further comprising an illuminating dimmer means responsive to the magnitude of the ambient light and operatively connected to the hemisphere illuminating means for adjusting the magnitude of interior illumination of the globe in response to changes in the magnitude of the ambient light.

* * * * *